(12) United States Patent
Dreyer

(10) Patent No.: US 10,464,599 B2
(45) Date of Patent: Nov. 5, 2019

(54) STEER-BY WIRE SYSTEM AND A METHOD FOR DATA EXCHANGE IN A STEER-BY-WIRE SYSTEM

(71) Applicant: Volkswagen Aktiengesellschaft, Wolfsburg (DE)

(72) Inventor: Dirk Dreyer, Stadthagen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/910,335

(22) Filed: Mar. 2, 2018

(65) Prior Publication Data

US 2018/0257703 A1   Sep. 13, 2018

(30) Foreign Application Priority Data

Mar. 7, 2017   (DE) .......... 10 2017 203 748

(51) Int. Cl.
*B62D 6/00* (2006.01)
*B62D 5/04* (2006.01)
(Continued)

(52) U.S. Cl.
CPC .......... *B62D 6/008* (2013.01); *B60R 16/0231* (2013.01); *B62D 5/001* (2013.01);
(Continued)

(58) Field of Classification Search
CPC ...... B62D 6/008; B62D 15/021; B62D 5/046; B62D 5/04; B60R 16/0231; B60R 16/023
See application file for complete search history.

(56) References Cited

U.S. PATENT DOCUMENTS

2002/0033301 A1\* 3/2002 Clephas ................ B62D 5/003
180/446
2003/0114969 A1\* 6/2003 Dominke ............... B62D 5/003
701/41
(Continued)

FOREIGN PATENT DOCUMENTS

DE    10112514 A1   6/2002   ......... B60G 17/0195
DE    10135736 C1   4/2003   ............... B62D 5/00
(Continued)

OTHER PUBLICATIONS

German Office Action, Application No. 102017203748.2, 5 pages, dated Dec. 20, 2017.

*Primary Examiner* — Jelani A Smith
*Assistant Examiner* — Majdi Alsomiri
(74) *Attorney, Agent, or Firm* — Slayden Grubert Beard PLLC

(57) ABSTRACT

The invention relates to a steer-by-wire system comprising a first control device that controls at least one steering actuator, and at least one second control device that controls at least one actuator on a steering handle in order to generate a haptic torque, wherein a sensor system for detecting a steering wheel angle is assigned to the second control device, wherein the first control device is connected with a first bus system and the second control device is connected with a second bus system, wherein the two bus systems are connected with each other via a gateway control device, and the first control device and the second control device are connected with each other directly via a third bus system, as well as a method for data exchange in such a steer-by-wire system.

7 Claims, 1 Drawing Sheet

(51) Int. Cl.
*B62D 15/02* (2006.01)
*B60R 16/023* (2006.01)
*B62D 5/00* (2006.01)

(52) U.S. Cl.
CPC ............ *B62D 5/046* (2013.01); *B62D 5/0457* (2013.01); *B62D 15/021* (2013.01)

(56) References Cited

U.S. PATENT DOCUMENTS

| | | | |
|---|---|---|---|
| 2004/0026158 A1* | 2/2004 | Rieth | B62D 5/003 180/402 |
| 2006/0015231 A1* | 1/2006 | Yoshimura | B60K 6/46 701/48 |
| 2006/0056124 A1* | 3/2006 | Michalko | B60R 16/023 361/62 |
| 2007/0045035 A1 | 3/2007 | Pfeiffer et al. | 180/402 |
| 2009/0299569 A1* | 12/2009 | Knoll | B60W 50/14 701/36 |
| 2014/0288786 A1* | 9/2014 | Mayser | B60W 50/0205 701/48 |

FOREIGN PATENT DOCUMENTS

| | | | |
|---|---|---|---|
| DE | 10333281 A1 | 2/2005 | ............... B62D 5/00 |
| WO | 2005/012063 A1 | 2/2005 | ............... B62D 5/00 |

\* cited by examiner

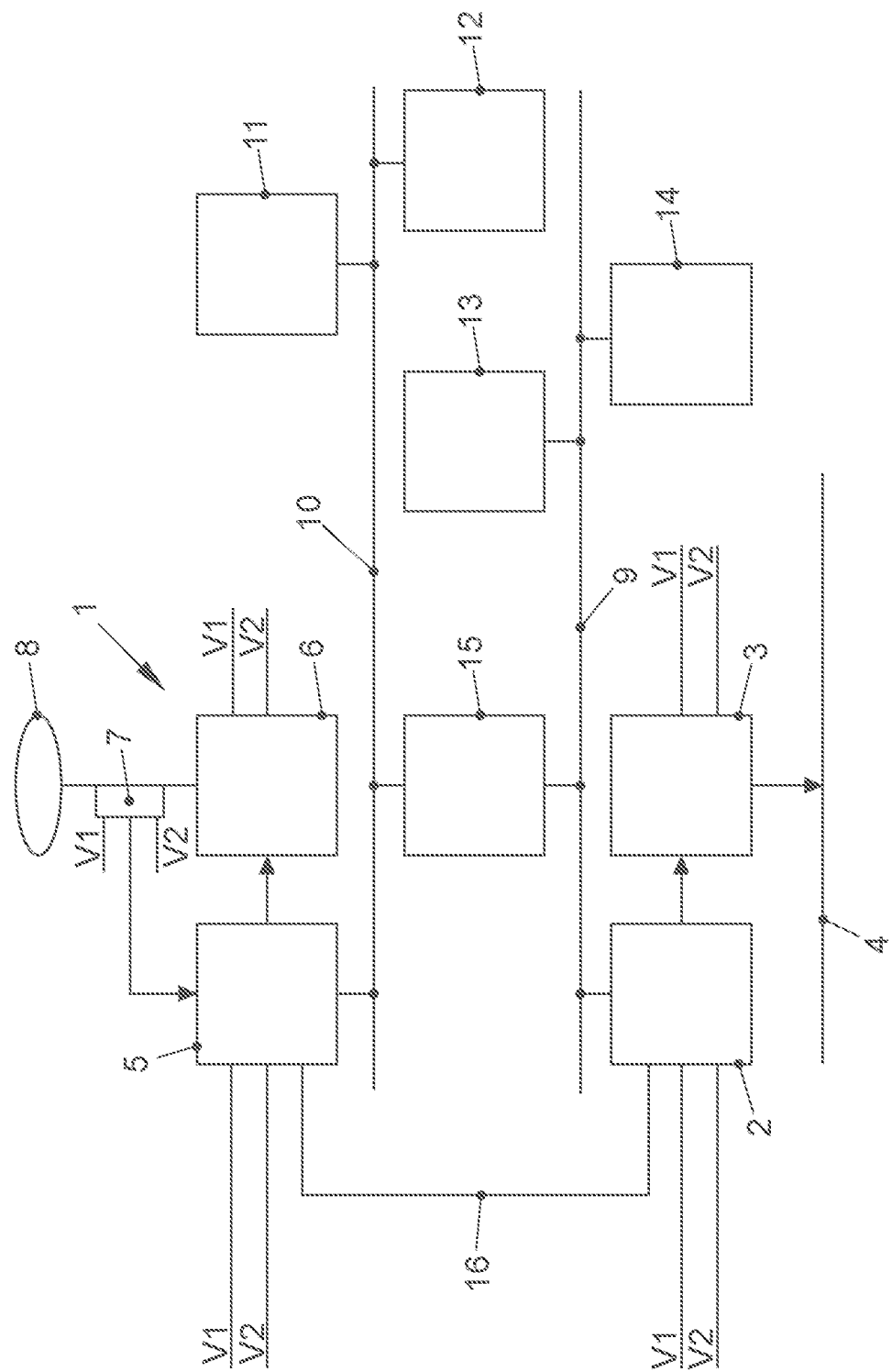

STEER-BY WIRE SYSTEM AND A METHOD FOR DATA EXCHANGE IN A STEER-BY-WIRE SYSTEM

CROSS-REFERENCE TO RELATED APPLICATIONS

This application claims priority to DE Application No. 10 2017 203 748.2 filed Mar. 7, 2017 with the German Patent and Trademark Office, the contents of which application are hereby incorporated by reference in their entireties.

TECHNICAL FIELD

The invention relates to a steer-by-wire system and a method for data exchange in a steer-by-wire system.

Steer-by-wire systems are characterized in that there is no mechanically operative connection between a steering handle/steering control and a steering actuator. The steering actuator, for example an electric motor, is controlled by a first control device. The electric motor then applies, for example, a force to a gear rack in order to deflect the wheels. A sensor system for detecting a steering wheel angle is arranged at the steering handle, for example a steering wheel. This steering wheel angle is transmitted to the first control device, and from that a desired steering angle is established as a driver's request and is implemented by the steering actuator. In addition, it is known to assign an actuator to the steering handle in order to generate a haptic counter-torque on the steering handle so that the motor vehicle operator receives haptic feedback from his steering movements. This actuator may, for example, be an electric motor that is driven by a second control device. These systems should be designed intrinsically safe, in particular with regard to the network connections, for which two independent bus connections are desirable. Since the actuator on the steering handle may also give haptic feedback of the street or respectively the driving dynamics, a relatively fast data connection from the first control device to the second control device would be desirable. However, this reaches the limits of conventional bus systems with many control devices.

BACKGROUND

An X-by-wire system for a vehicle is known from DE 101 12 514 A1 comprising at least one sensor for detecting an actuation of an input apparatus, at least one control device for defining a desired regulating action, and at least one energy supply, whereby the sensor, control device, regulating system and energy supply are each composed redundantly of first and second modules and the two modules form an assembly. The modules of an assembly are thereby decoupled from each other without feedback, wherein the first modules are connected with each other and form a first subsystem and the second modules are connected with each other and form a second subsystem, wherein at least the second subsystem is formed exclusively from the second modules. The communication between the modules preferably occurs via a redundant bus system.

SUMMARY

An underlying technical problem is to provide a steer-by-wire system that allows intrinsic safety at high transfer rates and low cost. A further technical problem is to provide a method for data exchange in such a steer-by-wire system.

The problem is solved by a steer-by-wire system with the features of the independent apparatus claim as well as by a method with the features of the independent method claim. Embodiments of the invention are described in the dependent claims and the following specification.

BRIEF DESCRIPTION OF THE DRAWINGS

The invention is explained in the following using exemplary embodiments.

FIG. 1 shows a schematic block diagram of a steer-by-wire system.

DETAILED DESCRIPTION OF EMBODIMENTS

According to one embodiment, the steer-by-wire system comprises a first control device that controls at least one steering actuator, and at least one second control device that controls at least one actuator on a steering handle/steering control in order to generate a haptic torque. A sensor system for detecting a steering wheel angle is assigned to the second control device. The first control device is connected with a first bus system and the second control device is connected with a second bus system, wherein the two bus systems are connected with each other via a gateway control device. Furthermore, the first and second control device are connected with each other directly via a third bus system. In this embodiment, the control devices are networked intrinsically safe via the two first bus systems, wherein the first and second control devices each only need to have one bus interface as a result of the connection via the gateway control device. The time-critical data may be transmitted through the third bus system, wherein a relatively high data transfer rate is possible due to the fact that only two control devices are communicating, e.g., not more than two. The third bus system in one embodiment may have a higher data transfer rate than the first and second bus system. For example, the data transfer may be at least twice as high as the data transfer rate of the first and second bus systems.

In one embodiment, the second control device is designed so as to transmit at least the data from the sensor system additionally via the gateway control device to the first control device, wherein at least security/safety-related data are exchanged between the first and second control device via the third bus system. Accordingly, the data from the sensor system are transferred redundantly, namely from the second control device via the gateway control device and via the third bus system directly to the first control device. Thus, the first control device may obtain data from the sensor system even in the event of a malfunction of a bus system.

In a further embodiment, at least the first control device and the steering actuator as well as the second control device and the sensor system have a redundant voltage/power supply so that operating the steering is possible even in the event of a malfunction of a voltage supply. The actuator for generating the torque on the steering handle is not relevant to safety, so that a redundancy is dispensable here, but may be provided anyway in a corresponding embodiment.

The invention is explained in the following in more detail with reference to FIG. 1.

A block diagram of a steer-by-wire system 1 is shown in FIG. 1. The steer-by-wire system 1 comprises a first control device 2 and a steering actuator 3 that is, for example, designed as an electric motor and transfers a force to a gear rack 4. The steer-by-wire system 1 further comprises a second control device 5, an actuator 6, a sensor system 7 for detecting a steering wheel angle, and a steering handle 8.

The second control device 5 drives the actuator 6, whereby it generates a haptic torque on the steering handle 8. Various characteristic curves may for example be stored in the second control device 5 so that, depending on the transmission ratio between the steering wheel angle and the actual steering angle at the vehicle wheels, a different torque is set on the steering handle 8. Mechanical end stops may also be simulated on the steering handle 8 in an embodiment. The data from the sensor system 7 are transmitted to the second control device 5. The first control device 2 is connected with a first bus system 9 and the second control device 5 is connected with a second bus system 10, wherein further control devices 11-14 are connected to the first and second bus system 9, 10. These control devices 11-14 may be, for example, control devices from assistance systems that generate steering demands (for example, lane departure warning) or generate torques on the steering handle (for example, vibrations for tiredness). Control devices 11-14 may also be connected with the two bus systems 9, 10. At least one gateway control device 15 exists in this embodiment, which is connected with both bus systems 9, 10 and which may route messages from one bus system to the other bus system.

In addition, the first control device 2 and the second control device 5 are connected with each other directly via a third bus system 16. The first bus system 9 and the second bus system 10 are, for example, CAN bus systems with a data transfer rate of 500 kBit/s. The third bus system 16 is, for example, also a CAN bus system with a data transfer rate of 1 MBit/s. In principle, however, bus systems other than CAN may be used for the first, second and third bus system in corresponding embodiments.

The individual components of the steer-by-wire system 1 in an embodiment are designed additionally with a redundant voltage supply V1, V2, wherein the redundant voltage supply is optional for the actuator 6.

The two control devices 2, 5 may exchange all data which are of interest for each of the other control devices 5, 2, especially also the data from the sensor system 7, bidirectionally via the fast third bus system 16. Additionally, the data from the sensor system 7 from the second control device 5 are transferred via the second bus system 10 to the gateway control device 15 and from there are transferred via the first system 9 to the first control device 2 so that the data from the sensor system 7 are transferred redundantly to the first control device 2.

The presented steer-by-wire system allows a fast data transfer between the two control devices 2, 5 wherein the networking is intrinsically safe and the data from the sensor system 7 are transferred redundantly, wherein the control devices 2, 5 only need to have two network interfaces.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfil the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A steer-by-wire system comprising:
    a steering actuator control device that controls at least one steering actuator; and
    at least one steering handle control device that controls at least one actuator on a steering handle in order to generate a haptic torque, wherein
    a sensor system for detecting a steering wheel angle is assigned to the steering handle control device, wherein
    the steering actuator control device is connected with a first bus system and the steering handle control device is connected with a second bus system, wherein
    a plurality of additional control devices are connected to each of the first and second bus systems,
    the two bus systems are connected with each other via a gateway control device,
    the steering actuator control device and the steering handle control device are networked with each other to exchange data via the first bus system, the second bus system, and the gateway control device, and
    the steering actuator control device and the steering handle control device are additionally connected with each other to exchange data directly via a third bus system.

2. The steer-by-wire system according to claim 1, wherein the steering handle control device is designed so as to transmit at least data from the sensor system via the gateway control device to the steering actuator control device, wherein at least safety-related data are exchanged between the steering actuator control device and steering handle control device via the third bus system.

3. The steer-by-wire system according to claim 2, wherein at least the steering actuator control device and the steering actuator as well as the steering handle control device and the sensor system have a redundant voltage supply.

4. The steer-by-wire system according to claim 1, wherein at least the steering actuator control device and the steering actuator as well as the steering handle control device and the sensor system have a redundant voltage supply.

5. A method for data exchange in a steer-by-wire system, comprising:
    using a steering actuator control device that controls at least one steering actuator, and
    using a steering handle control device that controls at least one actuator on a steering handle in order to generate a haptic torque, wherein a sensor system for detecting a steering wheel angle is assigned to the steering handle control device, wherein the steering actuator control device is connected with a first bus system and the steering handle control device is connected with a second bus system, wherein a plurality of additional control devices are connected to each of the first and second bus systems, the two bus systems are connected with each other via a gateway control device, the steering actuator control device and the steering handle control device are networked with each other via the first bus system, the second bus system, and the gateway control device, and the steering actuator control device and the steering handle control device are additionally connected with each other to exchange data directly via a third bus system, the method further comprising:
    transmitting at least data from the sensor system via the gateway control device to the steering actuator control device; and exchanging at least safety-related data between the steering actuator control device and the steering handle control device via the third bus system.

6. A computer-implemented method for data exchange in a steer-by-wire system comprising:
   using a steering actuator control device that controls at least one steering actuator, and
   using a steering handle control device that controls at least one actuator on a steering handle in order to generate a haptic torque, wherein
   the system comprises a sensor system for detecting a steering wheel angle, which sensor system is assigned to the steering handle control device, wherein the steering actuator control device is connected with a first bus system and the steering handle control device is connected with a second bus system, wherein a plurality of additional control devices are connected to each of the first and second bus systems, the two bus systems are connected with each other via a gateway control device, the steering actuator control device and the steering handle control device are networked with each other via the first bus system, the second bus system, and the gateway control device, and the steering actuator control device and the steering handle control device are connected with each other to exchange data directly via a third bus system, the method further comprising:
   transmitting at least data from the sensor system via the gateway control device to the steering actuator control device; and
   exchanging at least safety-related data between the steering actuator control device and the steering handle control device via the third bus system.

7. A non-transitory machine-readable medium including contents that are configured to cause a steer-by-wire system to conduct the method of claim 6.

* * * * *